United States Patent [19]

Arndt et al.

[11] 4,127,181

[45] Nov. 28, 1978

[54] WATER DRIVE SYSTEM FOR A CENTER PIVOT IRRIGATION UNIT OR THE LIKE

[75] Inventors: Kenneth E. Arndt, Columbus; Lonnie E. Otto, Jr., Lindsay; David A. Siekmeier, Columbus, all of Nebr.

[73] Assignee: Lindsay Manufacturing Company, Lindsay, Nebr.

[21] Appl. No.: 781,577

[22] Filed: Mar. 28, 1977

Related U.S. Application Data

[62] Division of Ser. No. 706,475, Jul. 19, 1976, Pat. No. 4,074,783.

[51] Int. Cl.² ............................................. B05B 3/12
[52] U.S. Cl. .................................. 180/14 R; 188/82.7
[58] Field of Search ............... 180/14 R, 103 R, 66 R; 239/177, 190, 212; 137/344; 92/89, 90; 280/704; 188/170, 82.7

[56] References Cited

U.S. PATENT DOCUMENTS

| | | | |
|---|---|---|---|
| 2,893,643 | 7/1959 | Gordon | 180/66 R |
| 2,941,727 | 6/1960 | Zybach | 239/177 |
| 2,974,976 | 3/1961 | Lyall | 280/704 |
| 2,991,763 | 7/1961 | Marette | 92/89 X |
| 3,952,768 | 4/1976 | Townsend | 188/170 |
| 3,952,952 | 4/1976 | Townsend | 137/344 |
| 3,965,924 | 6/1976 | Kennedy | 137/344 |
| 4,005,729 | 2/1977 | Townsend | 239/177 |

Primary Examiner—Kenneth H. Betts
Attorney, Agent, or Firm—Kinzer, Plyer, Dorn & McEachran

[57] ABSTRACT

This is concerned with a water drive system for a center pivot irrigation system in which a string of pipe pivots in a circle or oscillates about a center pivot or upright with the pipe supported on towers at intervals and each tower being independently driven by a power mechanism which is operated by the pressure of the water in the string of pipe. It includes a mechanism to prevent one or more towers from rolling ahead on a downhill slope, a diaphragm valve arrangement for controlling the cycling of the drive, and an enlarged bellows or bladder for operating the water drive mechanism.

10 Claims, 7 Drawing Figures

WATER DRIVE SYSTEM FOR A CENTER PIVOT IRRIGATION UNIT OR THE LIKE

This is a division of application Ser. No. 706,475, filed July 19, 1976, now U.S. Pat. No. 4,074,783.

SUMMARY OF THE INVENTION

This invention is concerned with a so-called center pivot irrigation system, although certain aspects or features may be used with other irrigation devices.

A primary object of the invention is the so-called water or fluid drive for the towers on a center pivot irrigation system which individually propels each of the towers.

Another object is a water drive of the above type which avoids fouling of the operating mechanism by dirt and sediment in the water.

Another object is a water drive of the above type which uses a diaphragm or hydrobag.

Another object is a water drive of the above type which is low in cost, gives longer life, and is less vulnerable to sand abrasion.

Another object is a braking mechanism which prevents the tower from rolling ahead of the drive mechanism, for example on a downhill slope.

Another object is a brake mechanism of the above type which is load-responsive or load-sensitive.

Another object is a single acting or one way operating power drive for a center pivot unit which includes an automatic brake or clutch to prevent the unit from rolling ahead downhill.

Another object is a diaphragm valve arrangement for cyclically operating a water drive which reduces or eliminates any problems of sand or sediment on valve seats, cylinder parts, abrasion, etc.

Other objects will appear from time to time in the ensuing specification and drawings.

BRIEF DESCRIPTION OF THE DRAWINGS

FIG. 4 is a side view of the tower of FIG. 2;

DESCRIPTION OF THE PREFERRED EMBODIMENT

Figure 1:
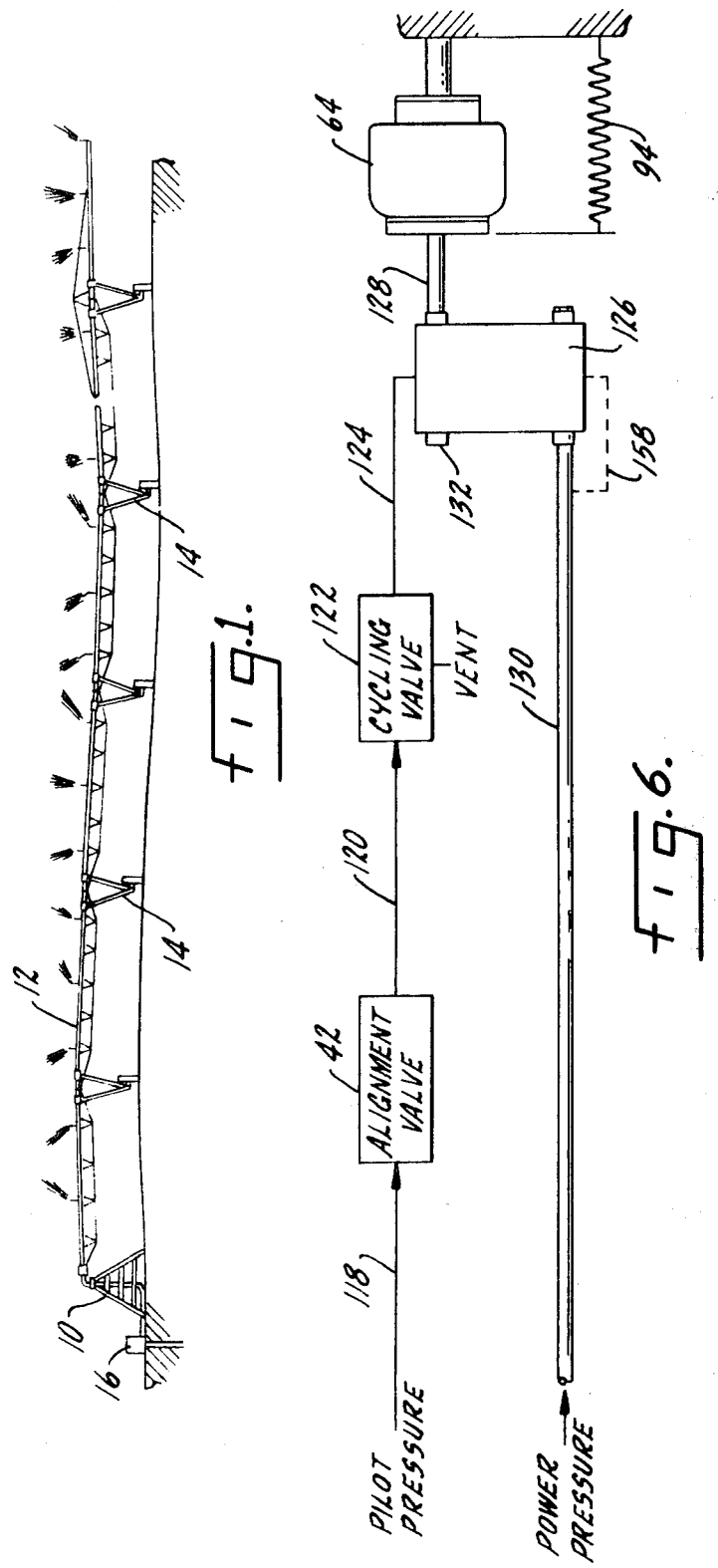
FIG. 1 is a side view of a typical self-propelled center pivot irrigation system.

FIG. 1 is a diagrammatic side view of a typical center pivot irrigation system in which a field of any suitable size has a center pivot 10 disposed generally in the center of the field with a suitable pipeline extending outwardly therefrom, as at 12, supported at intervals by movable towers 14, each of which is self-propelled so that a generally circular area will be irrigated by the system. The center pivot 10 is connected to a suitable water source, such as a well with a pump 16 or the like.

Figure 2:
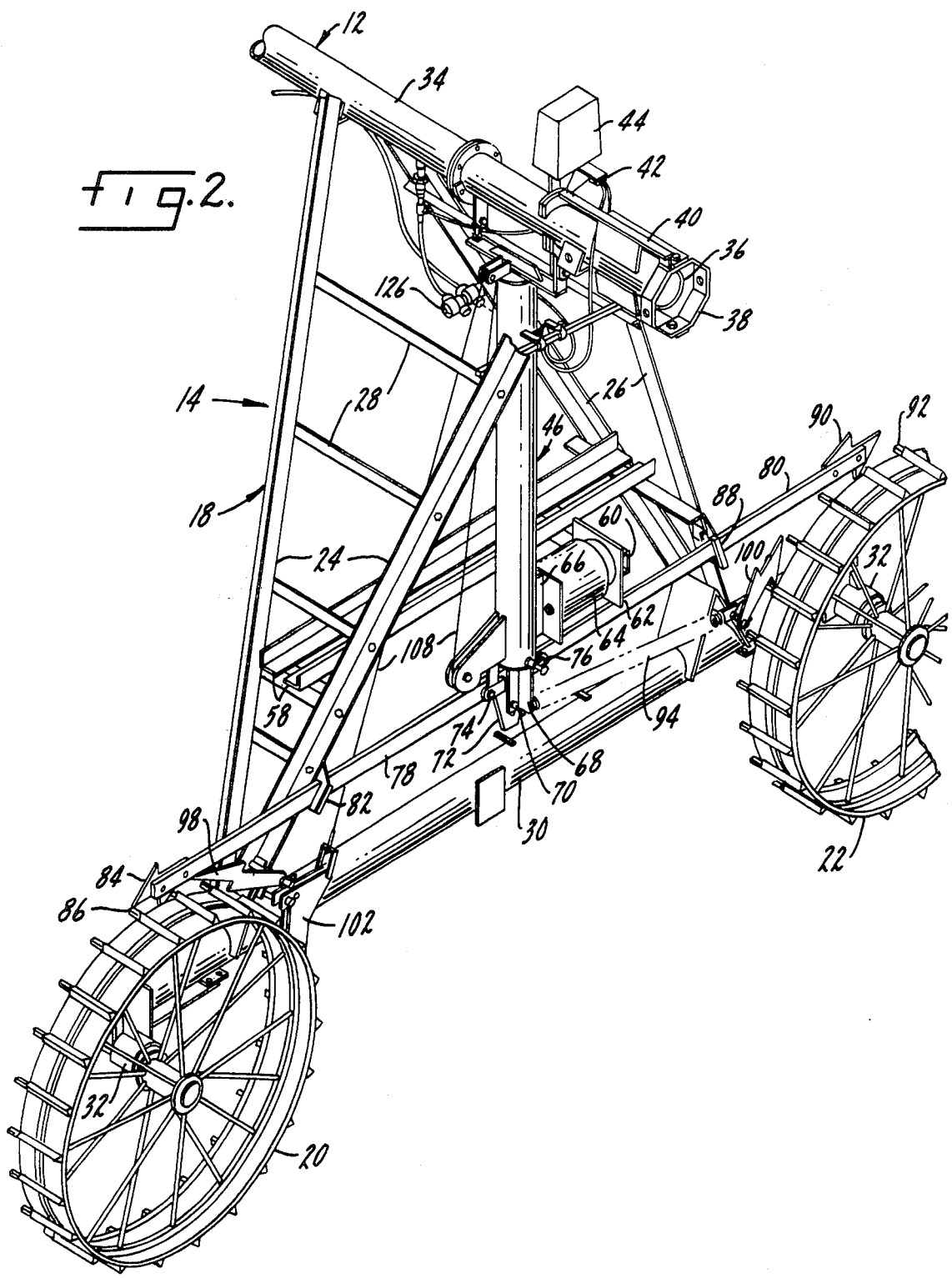
FIG. 2 is a perspective of one of the towers.

In FIG. 2 a perspective of one of the towers 14 has been shown which includes a generally upright frame 18 made up of suitable braces or angles which extend and converge generally upwardly to connect to the pipeline and downwardly to corners to support or accept wheels on each end. The details of the angles, etc. that make up the frame are of no great importance and will only be referred to where necessary in explaining the water drive mechanism. In FIG. 2 the tower may be considered to move generally to the left so the wheel 20 will be referred to as the forward wheel and 22 as the rear wheel.

The frame includes two forward angles 24 which connect or join at the bottom and diverge upwardly as shown where they are attached in any suitable manner at their upper ends to the pipeline. The same is true of the two rearward angles 26. These angles may be interconnected by braces 28 which may be used as steps. A longitudinal tube or column 30 is interconnected between the bottom of the angles with axles 32 for the wheels. The pipe end 34 shown may be considered to terminate at 36 inside of a flexible coupling which may be of the type sold by the assignee hereof, Lindsay Manufacturing Company, of Lindsay, Neb., under the trademark "UNIKNUCKLE" and shown and described in detail in U.S. Pat. No. 3,738,687, issued June 12, 1973. Among other things, such a connection includes a sealing boot or coupling, not shown, into which the end of the next adjacent pipe extends, also not shown. A gimbal ring and sensing mechanism 38, shown and explained in detail in the above referred to prior patent, senses the horizontal alignment of one pipe section relative to the next and energizes or deenergizes the drive mechanism for a particular tower, depending upon the alignment and movement of the next adjacent outward tower. A lever arm 40 from the gimbal ring passes any misalignment on to an alignment valve 42 mounted on a control box 44 which in turn is mounted above the tower. The alignment valve 42 and its function will be referred to more in detail hereinafter in connection with FIG. 6.

A pendulum mechanism, indicated broadly at 46, includes an upright or tank 48 connected to a bracket 50 in any suitable manner, which in turn is pivoted at 52 at each end on brackets 54 which are held below the pipe end 34 by collars 56. The upright or tank 48 is free to pivot about the longitudinal axis running through bolts or pivots 52 so that the tank may swing or pivot fore-and-aft in the plane of the frame.

Angles 58 on the frame support a bracket 60 which has an abutment 62 which supports or serves as a mounting for a flexible bellows or hydrobag 64. The other end of the hydrobag or bellows fits against and is connected to a bracket 66 which in turn is connected to the side of the tank or pendulum 48. The lower end of the pendulum or tank 48 has a depending angle 68 which is connected, by a pivot 70, to a triangle or plate 72 which in turn is pivoted, at 74 and 76, to forward and rearward pushrods or bars 78 and 80.

The forward pushrod or bar 78 extends through a guide 82 on the tower frame with a ratchet or dog 84 on the forward end thereof opposite lugs or extensions 86 on the forward wheel 20. The same is true of the rear pushrod or draw bar 80, meaning that it extends through a guide 88 on the frame with a claw or dog 90 on the rear end opposite lugs or extensions 92 on the rear wheel 22. Thus as the pendulum swings, the pushrods or bars will reciprocate back and forth, causing the dogs or claws to engage the lug extensions and rotate the wheels. The bars are moved to the left in FIGS. 2, 4 and 5 by expansion of the bellows or bag 64 and to the right by a return spring 94 which is dead-ended on the frame at 97 and pivoted at 96 to the triangle 72 which, it will be noted, is below the pivot 70 for the bottom of the pendulum. It will be noted that the dogs or claws 84 and 90 are reversible so that they may be turned upside-down when one abutment surface or claw has become excessively worn.

The wheels are provided with roll back brakes or latches 98 and 100 which are spring-biased by a suitable torsion spring or the like so that the claw thereof will engage the bars on the wheels to prevent the wheels from turning backward, which could be caused by the tendency of the tower to roll backwards on an upslope.

The towers are provided with a roll-forward brake which includes a latch 102 pivoted at 104 on the frame in a position so that a bar or tooth 106 thereon will engage the lugs or extensions on the forward wheel, tending to prevent the tower from rolling forward. The plate 102 is spring-biased clockwise in FIG. 4 by a suitable torsion spring 103 or the like so that the bar or tooth 106 will tend to engage the lug extensions. The brake is released by a cable 108 connected thereto which passes over a pulley or guide 110 at or toward the top of the pendulum and then extends downwardly around a pulley or guide 112 mounted on the forward part of the pendulum 48 and connected on an upstanding bracket 114 on the forward edge of the triangle 72. The action and operation of the antiforward roll brake and the various positions of the parts will be explained in connection with FIG. 3 hereinafter.

Figure 3:
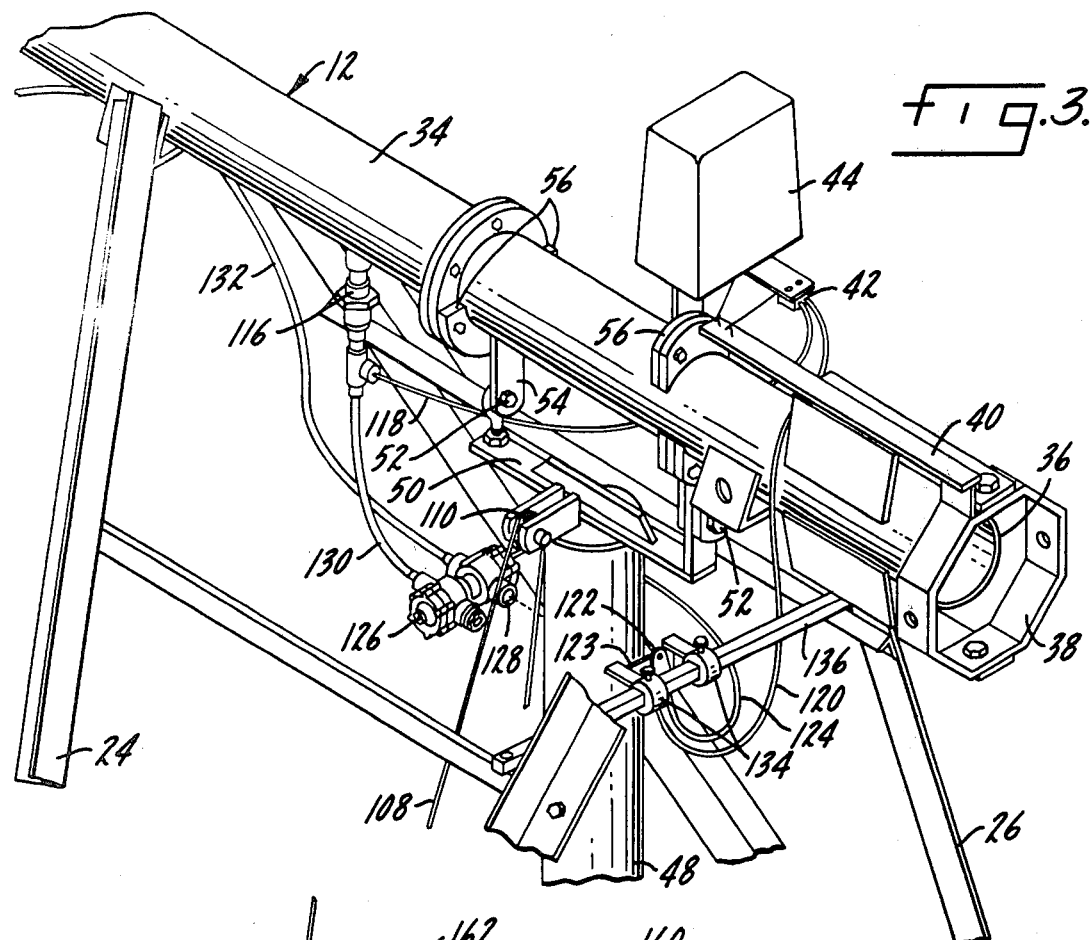
FIG. 3 is an enlargement of a portion of FIG. 2.
Figure 6:
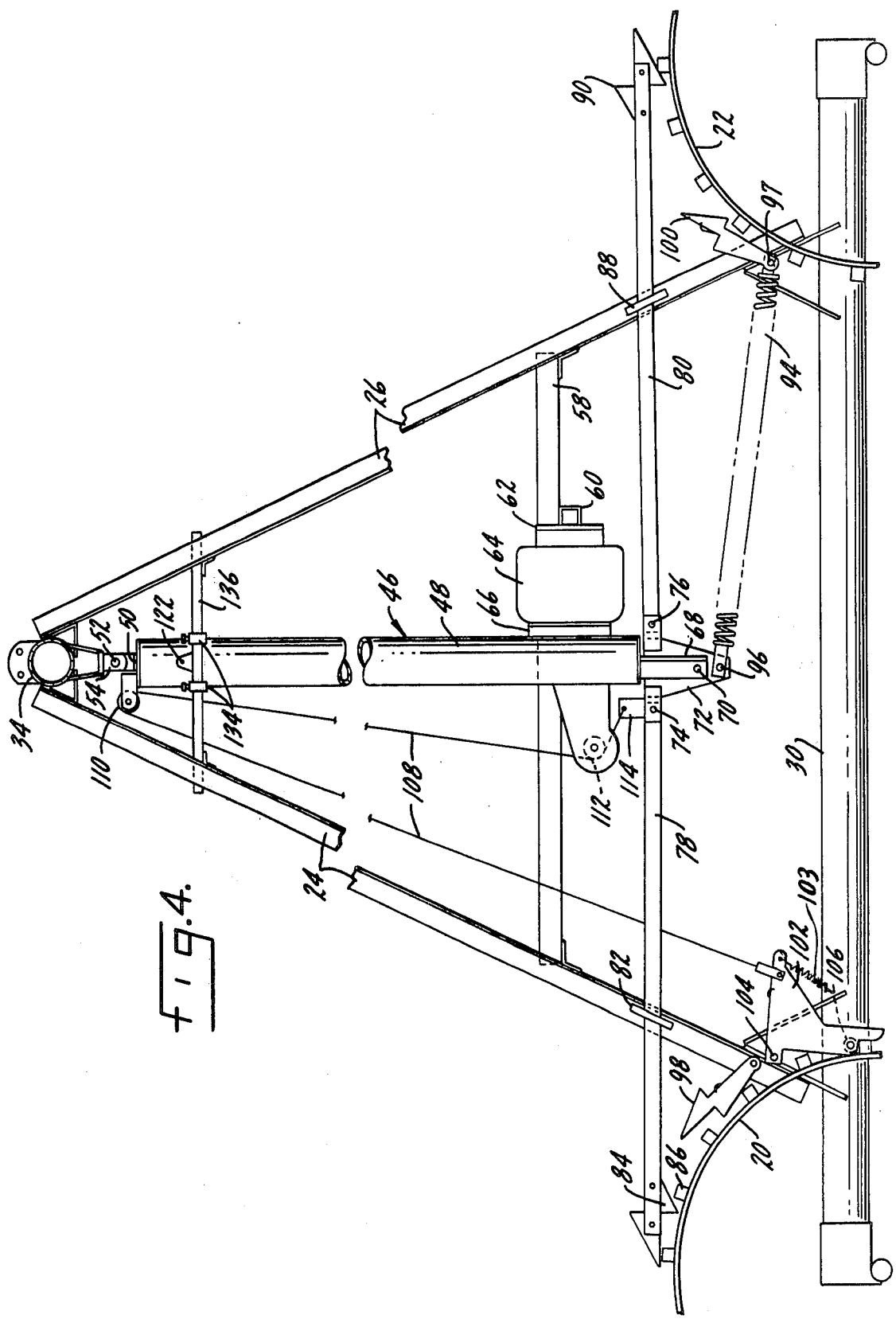
FIG. 6 is a circuit diagram.
Figure 7:
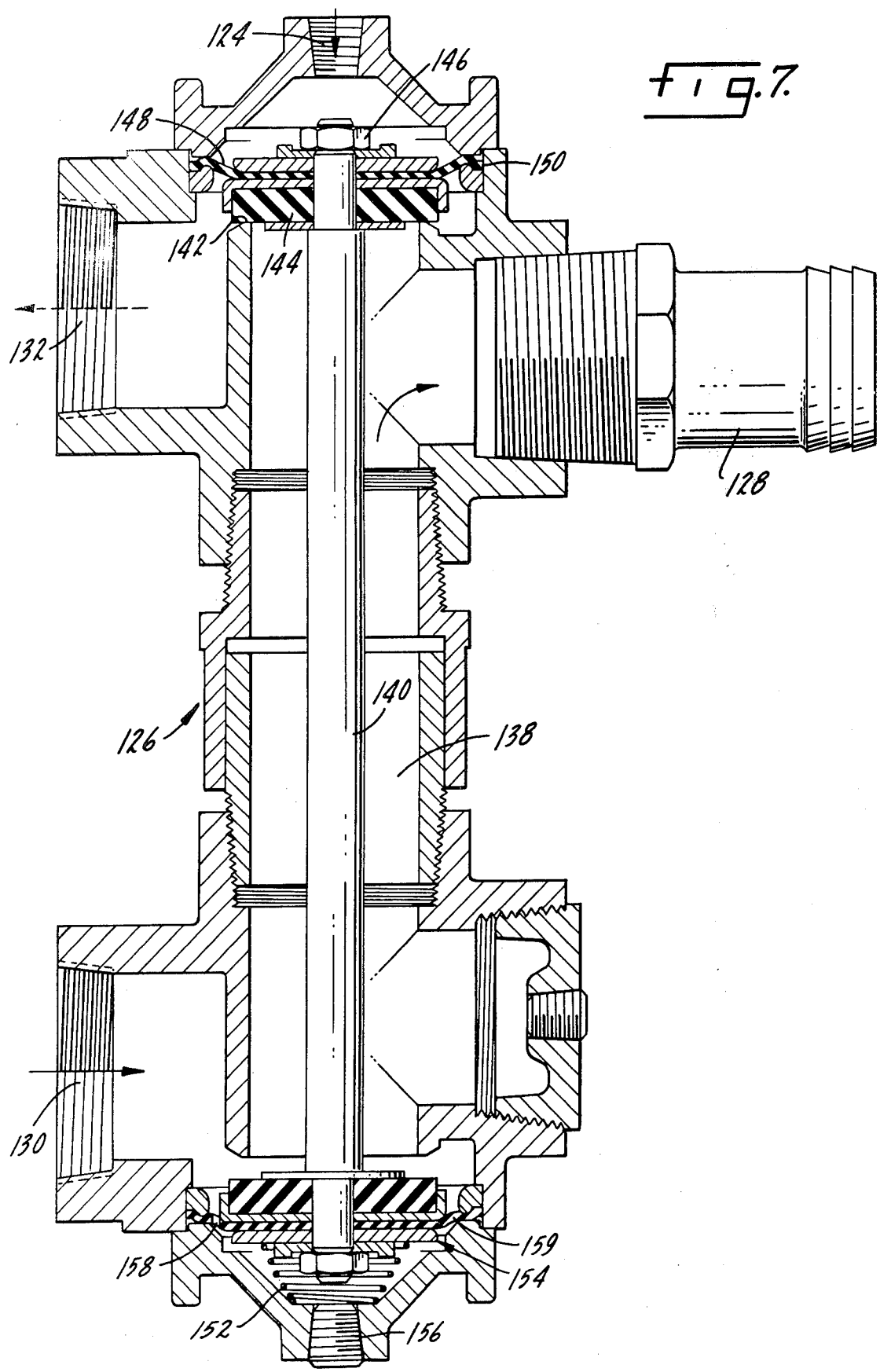
FIG. 7 is an enlarged cross section through one of the components of FIG. 6.

The hydraulic or water circuit which supplies pressure water to the bellows or hydrobag 64, and probably best be seen in FIGS. 3 and 6 where a suitable tap or connection 116 in the main pipeline 12 has a pilot line 118 connected thereto leading to the alignment valve 42 and then through a pilot line 120 to a three-way cycling valve 122 which is mounted on the side of the pendulum 48 by a bracket 123, then by a pilot line 124 to a three-way valve 126 which is a disphragm valve and shown in detail in FIG. 7. The diaphragm valve is connected directly into the pendulum or tank 48 by a connection 128, in FIG. 6, and in turn through the tank or pendulum into the hydrobag 64 by a suitable opening through or next to the mounting bracket 66. Pressure water from the pipeline 34 and fitting 116 is supplied to the diaphragm valve by a pipe or connection 130 and is exhausted from the diaphragm valve by a connection 132.

The three-way cycling valve 122 in the pilot line is moved back and forth by dogs 134 in FIG. 3 which are adjustably mounted on a bar 136 on the frame. As the pendulum swings back and forth, the cycling valve will hit first one dog and then the other, which will cause the cycling valve to reverse.

In FIG. 7 the diaphragm valve 126 has a central passage 138 with a valve rod 140 disposed therein, having valve elements at each end. Considering the upper valve element in FIG. 7 which is the exhaust valve, it will be noted that a circular valve seat 142 is formed in the housing with a valve element 144 made of rubber or a suitable rubberlike material opposite the valve seat and mounted against a shoulder on the valve rod 140 by a nut 146 or the like with a diaphragm 148 connected in the assembly and secured in a suitable manner as at 150 around the outside in the housing. A spring 152 of any suitable shape is mounted below the valve element 154 to provide an upward bias, in FIG. 7.

In FIG. 7 the upper valve is shown closed and the lower one open, the dimensioning being such that either one or the other is open while the other is closed. The lower valve element 154 may be the same, except that its threaded connection 156 is plugged and a bleed 158 through its diaphragm 159 is provided and is diagrammatically indicated in FIG. 6.

The use, operation and function of the invention are as follows:

There are at least three features in the invention which are considered important or significant.

Figure 5:
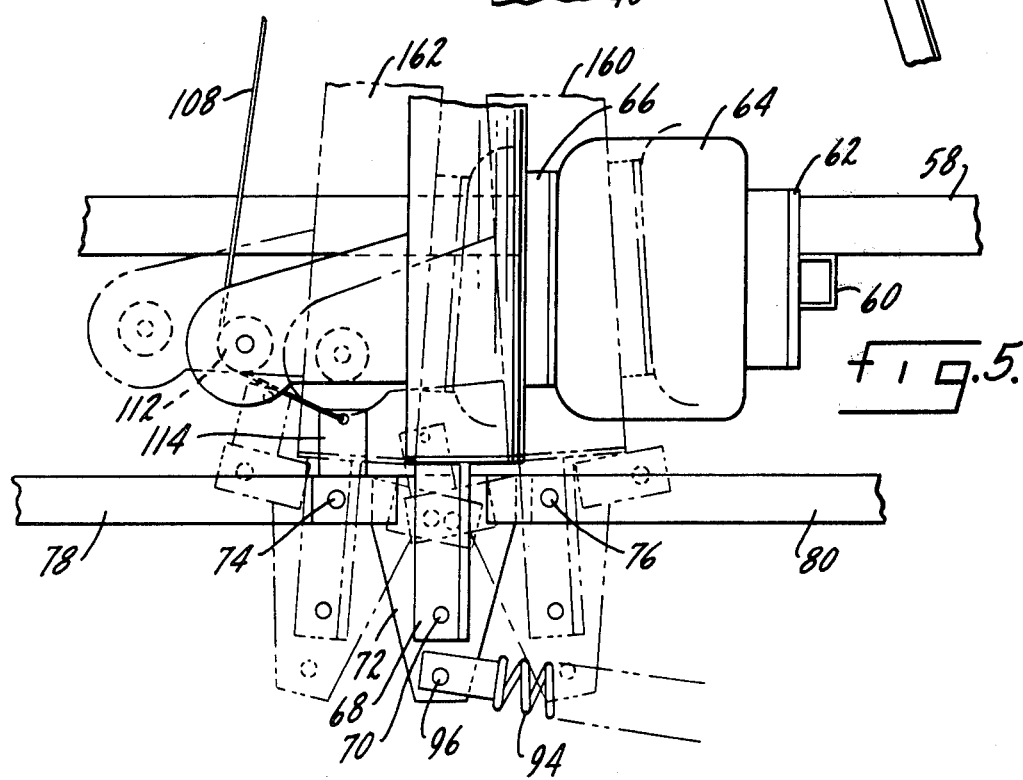
FIG. 5 is an enlargement of a portion of FIG. 4 showing various operative positions.

The bellows or hydrobag which supplies the motive force for rotating the wheels and thus moving the tower has the advantage that no moving or close-fitting parts are involved. Pressure water is supplied by the diaphragm valve to the hollow tank 48, through connection 128, and into the bag or bellows itself. This will cause the hydrobag to expand, which moves the pendulum to the left in FIG. 5. In FIG. 5 the mid position of the pendulum has been shown in full, while the extreme positions, when the hydrobag is empty and exhausted as at 160 and when it is full and at its maximum excursion, as at 162, have been shown in broken lines. This swinging of the pendulum back and forth moves the push rods 78 and 80 back and forth to rotate the wheels. Supplying pressure water to and exhausting it from the hydrobag is controlled by the cycling valve 126. The result is that there are no close fitting parts in or involved with the bellows or hydrobag and no surfaces, such as between a metal piston and cylinder, which can be scored or abrased. Since the water that is normally available to and is used in center pivot irrigation systems may well have a great deal of grit and sand in it, it is highly desirable to use a mechanism which will not abrade or score metal parts.

The hydraulic system operates as follows: High pressure water comes to the diaphragm valve 126 through a simple connection 130 and is exhausted therefrom through an exhaust connection or line 132 which may extend down along the pipeline 34 for a substantial distance, as indicated in FIG. 3, so that the exhaust water will not be discharged directly in the path of the wheels of the tower. The diaphragm valve either supplies high pressure water to the bellows or hydrobag 64 or exhausts it from it. The diaphragm valve is controlled by the pilot line 124 which taps into the water supply at 118, goes through the alignment valve 42, then through the cycling valve 122, before it leads into the top of the diaphragm valve in FIG. 7.

The alignment valve is either open or closed, depending upon whether the sensing mechanism 38–40 indicates that a particular tower is ahead or behind the general alignment of the next tower outboard of it. It will be understood that it is normal practice in center pivot irrigation systems to drive the outermost tower on a continuous or programmed basis and that each tower inboard thereof responds to the position of the next tower outboard through a sensing mechanism such as 38–40.

When the next outside or outboard tower to the right of the FIG. 2 tower moves ahead, it will move the gimbal ring 38 and arm 40 to open the alignment valve 42 which allows pilot pressure to go to the cycling valve 122. This will cause the FIG. 2 tower to move forward, as explained in detail hereinafter, until its alignment relative to the next outside tower is such that the gimbal ring 38 and arm 40 close the alignment valve 42 which will shut down the movement of the FIG. 2 tower.

Assuming that the alignment valve 42 is open, pilot pressure will pass through the cycling valve 122 and then to the top 124, in FIG. 7, of the diaphragm valve. Oscillation of the pendulum 48 back and forth alternately opens and closes the cycling valve 122. When the cycling valve 122 is open, pilot pressure will be connected to the top 124 of the diaphragm valve which will force the rod 140 down closing the upper or exhaust valve element 144 and opening the lower or inlet valve. This will allow pressure water from a connection 130 to flow through the lower valve, into the chamber 138 and to the hydrobag 64 through connection 128, thereby causing the pendulum to pivot clockwise in FIG. 5 carrying the cycling valve 122 with it until it hits the opposite stop 134, thereby closing the cycling valve. This blocks pilot pressure from the top of the upper diaphragm valve element at 124 and vents the pilot chamber. The valve element 144 will be unbalanced because of the pressure water in the chamber below the upper valve element 144 and spring pressure 152. The valve rod 140 will rise, thereby closing the inlet valve element and opening the exhaust. At this point the pendulum will be in the position 162 of FIG. 5 with the hydrobag at its maximum extension and the wheels will have been rotated one step or notch. The water in the pendulum and hydrobag will not be under much, if any, pressure and the return spring 94 will move the pendulum back from its 162 position to its 160 position, thereby forcing the water out of the hydrobag, into the pendulum, and out through the exhaust 132 in compressing the hydrobag to its maximum withdrawn or collapsed position. At the same time this will withdraw the pushrods and dogs for another power stroke.

The antiroll forward brake is operated by the triangle 72 and linkage shown in FIGS. 4 and 5. As the hydrobag fills with water, causing the pendulum to move from right to left in FIG. 5, the thrust thereof will be applied to the triangle 72 through pivot point 70 and against the return spring 94 which is pivoted at 96. The result will be an initial tendency for the triangle 72 to pivot or tip counterclockwise about connection 70 which tends to loosen or create slack in the cable 108 which in turn tends to leave the brake 102 engaged. But when either one or both of the dogs 84, 90 engage the lug extensions on the wheels, this would resist the counterclockwise tipping of the triangle 72 because the inner ends of the pushrods or bars 78, 80 are pivoted at 74, 76 above pivot point 70. Thus it is the resistance to the movement of the pushrods or bars 78, 80 caused by their engaging the lugs on the wheels that either prevents the triangle 72 from tipping counterclockwise or causes it to tip back. In either case this will cause counterclockwise tipping of the triangle which will move the cable connection 114 counterclockwise somewhat, thereby tensioning and drawing on the cable 108 which will pull up on the brake plate 102, thereby releasing the brake.

If the tower is on a downhill slope and tends to roll forward by itself, the brake 102 will hold it. When the pendulum and hydrobag are on the power stroke, the brake 102 will stay engaged until the dogs 84, 90 engage the wheel lugs and the resistance to further movement thereof causes the triangle 72 to pivot clockwise, thereby pulling on cable 108 and releasing the brake. If the downhill slope is steep enough and the tower tends to roll forward on its own as soon as the brake is released, the wheel lugs will roll away from the dogs 84, 90 which will allow the return spring 94 to pivot the triangle counterclockwise, thereby slackening cable 108 and reapplying the brake against the next wheel lug. Thus the tower cannot roll ahead on a down slope but will, at the worst, be allowed to move step by step as the brake is alternately applied and released, depending upon whether the thrust rods 78, 80 encounter resistance or not. It may well be that on a down slope the brake will be alternately applied and released and will merely allow the tower to roll down hill step by step but under a controlled movement. But this will conform to or be synchronized with the cycling of the pendulum and hydrobag and the movement of the tower will be the same as if it was being moved under the positive operation of the water drive.

The anti-rollahead brake should be broadly viewed as a lost motion connection which insures that the resistance to the thrust of the power arrangement, be it a bellows or hydrobag or what-have-you, first releases the brake. Absence such resistance, the wheels stay locked against forward rotation. The initial movement of the water drive first unlocks the brake and then rotates the wheels. The brake is responsive to the resistance offered to the bar mechanism so that the brake mechanism is either automatically applied or released, depending upon whether or not the wheels are stationary or tending to roll forward.

On an uphill slope, the latches 98, 100 will prevent the tower from rolling rearwardly and it will be moved uphill by the water drive. During the return stroke of the water drive, the latches 98, 100 will hold the wheels stationary and when the water drive is rotating the wheels forward, the latches 98, 100 will merely ratchet over the wheel lugs.

The advantage of the diaphragm valve, shown in FIG. 7, in a circuit of this nature is that the disc or valve elements 144 engage a plain cylinder seat and all movement to and away from the seat is axial with no sliding component. The result is that sand and grit will have no affect on whether the valve seats properly or not and will not cause wear over a period of time. This is to be contrasted to a piston and cylinder type valve where sand and grit between two sliding metal surfaces will cause rapid wear and deterioration. The combination of a diaphragm valve with a bellows or hydrobag, such as 64, insures that there are no metal-to-metal sliding parts anywhere in the system which will make the unit in the system about as maintenance-free, in this respect, as possible.

While the preferred form and several variations of the invention have been shown and described, it should be understood that suitable additional modifications, changes, substitutions and alterations may be made without departing from the invention's fundamental theme.

The embodiments of the invention in which an exclusive property or privilege is claimed are defined as follows:

1. In a water drive system for propelling a wheeled tower for a center pivot irrigation system in which a string of pipe is supported at intervals on such wheeled towers and extends outwardly from and pivots about a center pivot, the improvement comprising a brake system for such a tower to prevent it from running ahead of the water drive on a downhill slope, including a water-operated power unit for rotating at least one wheel of the tower, a linkage between the power unit and the wheel for transmitting the thrust of the power unit to the wheel, a brake on the wheel, and means responsive to the operation of the linkage to deactivate the brake in response to the resistance of the wheel to the thrust of the linkage so that the brake will not be released if the tower rolls ahead of the thrust of the power unit on a downhill slope.

2. The structure of claim 1 in which the power unit at least in part is in the form of a rubber bellows.

3. The structure of claim 1 in which the brake is spring-biased to its braking position and the resistance of the thrust of the linkage is transmitted to the brake by a cable which releases the brake against the bias of the spring.

4. The structure of claim 1 in which the power unit is actuated by the pressure of the water in the spring of pipe for its power stroke and has a spring return.

5. The structure of claim 1 in which at least one of the wheels has a ratchet which prevents the tower from rolling backward on an uphill slope.

6. In a water drive system for a center pivot irrigation system in which a string of pipe is supported at intervals on wheeled towers and extends outwardly from and pivots about a center pivot, a water drive and braking system for such a tower including a water-operated reciprocating power unit for rotating at least one wheel of the tower, a brake on the wheel, and a load-sensing mechanism responsive to the thrust of the power unit against the wheel for deactivating the brakes so that the brake will not be released if the tower rolls ahead of the thrust of the power unit on a downhill slope.

7. The structure of claim 6 further characterized in that the power unit at least in part is in the form of a rubber bellows.

8. The structure of claim 6 in which the brake is spring-biased to its braking position and the resistance of the thrust of the power unit is transmitted to the brake by a cable which releases the brake against the bias of the spring.

9. The structure of claim 6 further characterized in that the power unit is actuated by the pressure of the water in the string of pipe for its power stroke and has a spring return.

10. The structure of claim 6 further characterized in that at least one of the wheels has a ratchet which prevents the tower from rolling backwards on an uphill slope.

* * * * *